(12) United States Patent
Clark et al.

(10) Patent No.: US 7,962,552 B2
(45) Date of Patent: Jun. 14, 2011

(54) BORROW AND GIVE BACK OF WINDOWS

(75) Inventors: Bryan William Clark, Cambridge, MA (US); Seth Nickell, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 1073 days.

(21) Appl. No.: 11/271,809

(22) Filed: Nov. 14, 2005

(65) Prior Publication Data

US 2007/0113190 A1  May 17, 2007

(51) Int. Cl.
  *G06F 15/16* (2006.01)
  *G06F 3/041* (2006.01)
(52) U.S. Cl. ......................... 709/205; 345/173
(58) Field of Classification Search .................... 709/204
  See application file for complete search history.

(56) References Cited

U.S. PATENT DOCUMENTS

| | | | | |
|---|---|---|---|---|
| 5,043,919 A * | 8/1991 | Callaway et al. | ............. | 715/733 |
| 5,235,680 A * | 8/1993 | Bijnagte | ................ | 1/1 |
| 5,642,509 A * | 6/1997 | Ohshima et al. | ............. | 719/318 |
| 5,704,042 A * | 12/1997 | Hester et al. | .................. | 709/204 |
| 5,732,212 A * | 3/1998 | Perholtz et al. | ............... | 709/224 |
| 5,874,960 A | 2/1999 | Mairs et al. | | |
| 5,940,812 A * | 8/1999 | Tengel et al. | .................... | 705/38 |
| 5,996,002 A | 11/1999 | Katsurabayashi et al. | | |
| 6,151,606 A * | 11/2000 | Mendez | ........................ | 707/610 |
| 6,437,803 B1 | 8/2002 | Panasyuk et al. | | |
| 6,662,210 B1 * | 12/2003 | Carleton et al. | ............. | 709/204 |
| 6,710,790 B1 | 3/2004 | Fagioli | | |
| 7,007,048 B1 * | 2/2006 | Murray et al. | ................ | 707/204 |
| 7,219,070 B2 * | 5/2007 | Antonello et al. | ............. | 705/14 |
| 7,219,331 B2 * | 5/2007 | Pabla | ............................ | 717/120 |
| 7,430,681 B1 * | 9/2008 | Hobbs | .......................... | 713/400 |
| 2002/0163427 A1 * | 11/2002 | Eryurek et al. | .............. | 340/500 |
| 2002/0184608 A1 * | 12/2002 | Pabla | ............................ | 717/106 |
| 2003/0058275 A1 * | 3/2003 | Pilu et al. | ...................... | 345/751 |
| 2003/0078785 A1 * | 4/2003 | Antonello et al. | ................ | 705/1 |
| 2004/0260408 A1 * | 12/2004 | Scott et al. | ....................... | 700/20 |
| 2005/0144259 A1 * | 6/2005 | Buckley et al. | .............. | 709/219 |
| 2005/0278654 A1 * | 12/2005 | Sims | ............................. | 715/790 |
| 2007/0027996 A1 * | 2/2007 | Stewart | ......................... | 709/230 |
| 2008/0162698 A1 * | 7/2008 | Hopen et al. | .................. | 709/226 |

\* cited by examiner

*Primary Examiner* — Thuha T. Nguyen
*Assistant Examiner* — Margishi Desai
(74) *Attorney, Agent, or Firm* — MH2 Technology Law Group LLP

(57) ABSTRACT

Embodiments of the present invention provide methods and system for "borrowing" and giving back a window from one computer to another. Borrowing refers to actions performed by one computer to temporarily obtain and control a window from another computer.

18 Claims, 10 Drawing Sheets

BORROW AND GIVE BACK OF WINDOWS

DESCRIPTION OF THE INVENTION

1. Field of the Invention

The present invention relates generally to sharing information between computers. More particularly, the present invention relates to sharing one or more windows between computers.

2. Background of the Invention

Today, it is common for users to share applications and data across multiple computers. Modern networks, such as the Internet, increasingly allow users to transfer data between computers. Some conventional computer systems now allow a user at one computer to share a desktop view or an application with a user at another computer system.

Unfortunately, these conventional sharing systems are cumbersome because they require a full remote control session into the shared computer. In other words, conventional sharing technology relies upon accessing and controlling the entire shared computer. Thus, conventional sharing systems require a high level of access and control into the shared computer. Such a manner of access is often considered unsafe and blocked by many enterprise networks.

However, there are many instances where limited access to another computer may be useful. For example, a user may be using his computer to give a presentation over a projector. The user may then need information in a file or in a window that resides on another computer. Rather than resorting to an e-mail after the fact, it may be desirable for the user to access the other computer and quickly retrieve the desired information.

Accordingly, it may be desirable to provide methods and systems that allow a user to easily obtain desired information from a computer remotely.

SUMMARY OF THE INVENTION

In accordance with one feature of the invention, a method of borrowing a window from a host computer is provided. A connection to the host computer is opened. Windows at the host computer that are eligible to be borrowed are determined and at least one of the eligible windows is selected. The selected window is then borrowed from the host computer.

In accordance with another feature of the invention, a method of allowing a window to be borrowed by a remote computer is provided. A request to borrow a window is received from the remote computer. Information is provided that indicates windows that are eligible for borrowing. Information is then received that indicates a window that has been selected for borrowing. Display data for the selected window is intercepted and the display data for the selected window is sent to the remote computer.

In accordance with another feature of the invention, a system is configured to allow a user to move or borrow a window from one processor to another. A user may operate from a first processor and request to move a window for an application running on a second processor to the first processor. The user is authorized on the second processor. The first processor is currently in use by the user and configured to open a connection to the second computer. The first processor then determines windows at the second processor that are eligible to be borrowed. An eligible window is selected and the first processor borrows the selected window from the second processor. The second processor is coupled to the first processor and configured to receive the request to borrow a window. The second processor may provide information that indicates windows that are eligible for borrowing and determine the eligible window that has been selected for borrowing. The second processor may then intercept display data for the selected window and redirect the display data for the selected window to the first processor.

Additional features of the invention will be set forth in part in the description which follows, and in part will be obvious from the description, or may be learned by practice of the invention. It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Embodiments of the present invention provide methods and system for "borrowing" and giving back a window from one computer to another. The term window generally refers to the well known graphical user interface object that is displayed on the monitor of a computer system. Borrowing refers to actions performed by one computer to temporarily obtain and control a window from another computer. In some embodiments, borrowing a window is different from sharing a window, because it may require lower level of access or control, especially when joint or common access to the window on both machines is neither required nor desired.

Reference will now be made in detail to exemplary embodiments of the invention, which are illustrated in the accompanying drawings. Wherever possible, the same reference numbers will be used throughout the drawings to refer to the same or like parts.

Figure 1:
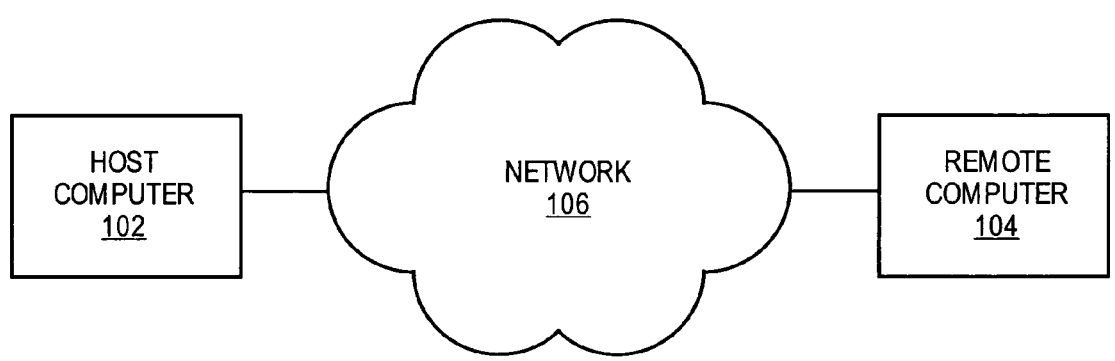
FIG. 1 shows an exemplary system in which embodiments of the present invention may be implemented.

FIG. 1 illustrates a system 100 that is consistent with the principles of the present invention. For purposes of illustration, system 100 is shown as a typical system implemented in a network environment, such as the Internet or a local area network.

As shown, system 100 may comprise a host computer 102 and a remote computer 104. These components may be coupled together via network 106. Network 106 may comprise one or more networks, such as a local area network, or wide area network. In addition, network 106 may support a wide variety of known protocols, such as the transport control protocol and Internet protocol ("TCP/IP") and hypertext transport protocol ("HTTP").

Computers 102 and 104 may be implemented on well known general purpose computers, workstations, and the like. For example, computers 102 and 104 may be implemented on personal desktop computers, laptop computers, personal digital assistants, and the like. Any device having a graphical user interface may serve as computer 102 or 104.

Computers 102 and 104 may run under an operating system and provide a graphical user interface that utilizes windows, such as the LINUX operating system, the Microsoft Windows™ operating system, and the like. Computers 102 and 104 may also operate various applications, such as word processing applications, spreadsheets, or an Internet browser application, such as Firefox™ by Mozilla, Internet Explorer™ by Microsoft Corporation, or Netscape Navigator™ by Netscape Communications Corporation.

One skilled in the art will also recognize that computers 102 and 104 may be implemented with various peripheral devices, such as a display, one or more speakers, and other suitable devices that are capable of providing feedback information to a user. Computers 102 and 104 may also be implemented with various peripherals for accepting input from a user, such as a keyboard, a mouse, a software application (such as a voice recognition application), and the like.

Figure 2:
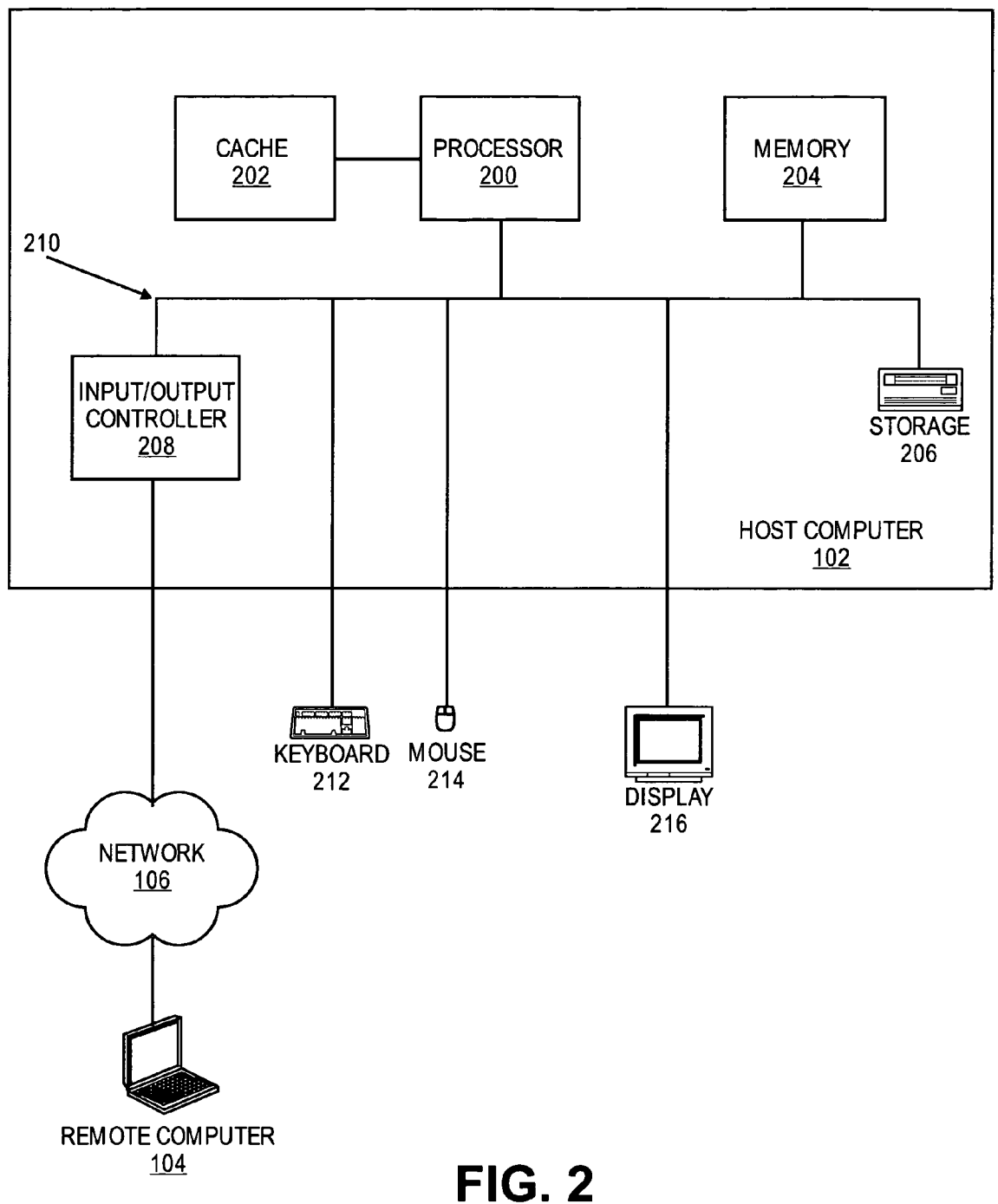
FIG. 2 illustrates some of the various components that may be included in computers shown in FIG. 1.

FIG. 2 illustrates some of the various components that may be included in computers 102 and 104. For purposes of brevity, FIG. 2 illustrates further detail for host computer 102. However, one skilled in the art will recognize that remote computer 104 may be configured in a similar fashion and include equivalent components. One skilled in the art will also recognize that either of computers 102 and 104 can operate as both a host and a remote computer system. Hence, computers 102 and 104 function as peers with respect to displaying borrowing windows.

Referring now to FIG. 2, host computer 102 is shown comprising a central processor 200, a cache 202, a main memory 204, a local storage device 206, and an input/output controller 208. These components may be implemented based on hardware and software that is well known to those skilled in the art.

Processor 200 may include cache 202 for storing frequently accessed information. Cache 202 may be an "on-chip" cache or external cache. Host computer 104 may also be provided with additional peripheral devices, such as a keyboard 212, a mouse 214, and a display 216. In the embodiment shown, the various components of server 104 communicate through a system bus 210 or similar architecture. Although FIG. 2 illustrates one example of the structure of host computer 102, the principles of the present invention are applicable to other types of computing systems.

Figure 3:
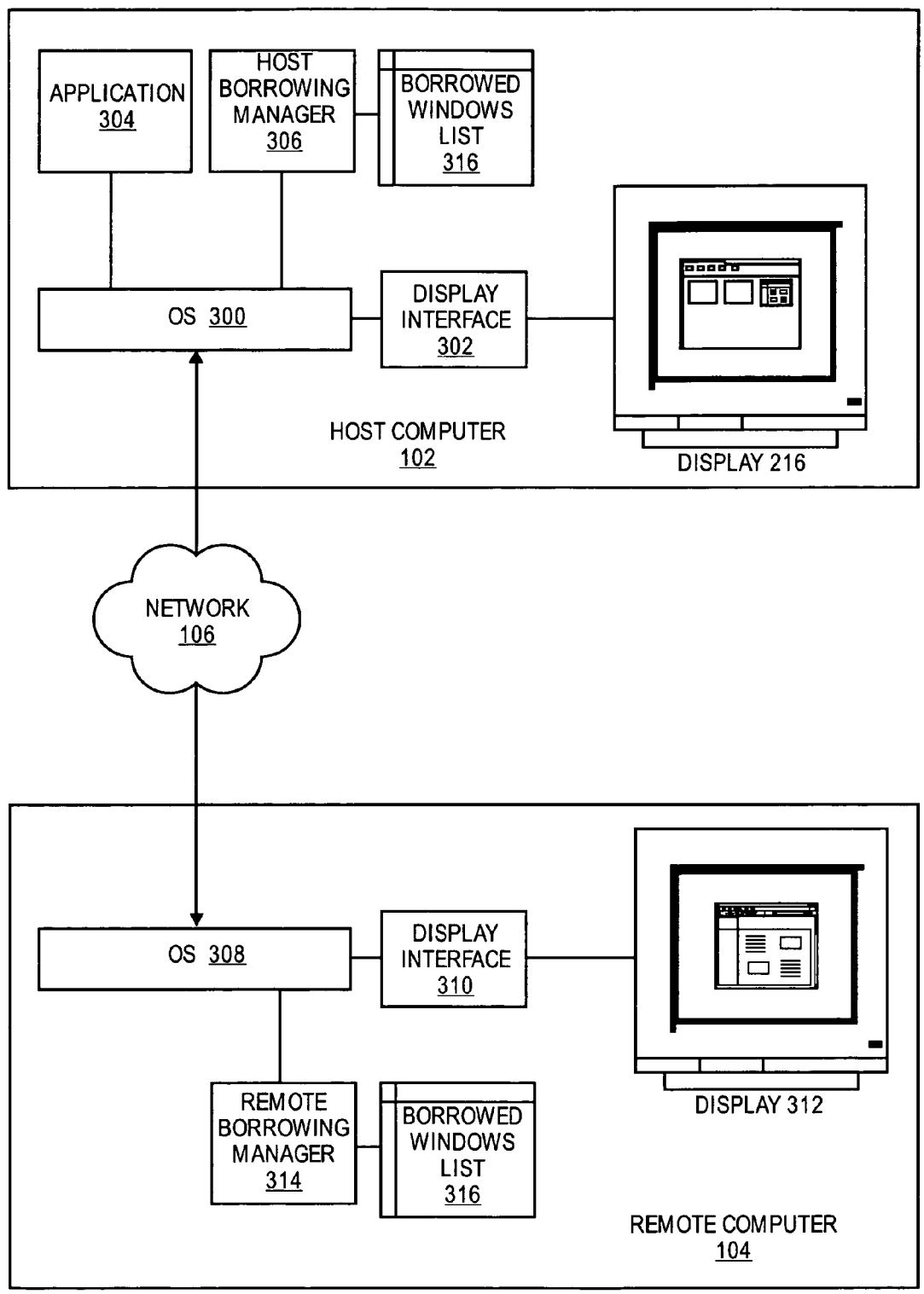
FIG. 3 shows a functional block diagram that illustrates the borrowing of a window from one computer to another.

FIG. 3 shows a functional block diagram that illustrates the borrowing of a window from host computer 102 to remote computer 104. As shown, host computer 102 may comprise an operating system (OS) 300, a display interface 302, display 216, an application 304, and a host borrowing manager 306. Likewise, remote computer 104 may comprise an OS 308, a display interface 310, a display 312, and a remote borrowing manager 314. These components will now be further described.

With regard to host computer 102, OS 300 is an integrated collection of routines that service the sequencing and processing of programs and applications host computer 102. OS 300 may provide many services for host computer 102, such as resource allocation, scheduling, input/output control, data management, and display management. OS 300 may be predominantly software, but may also comprise partial or complete hardware implementations and firmware. Well known examples of operating systems that are consistent with the principles of the present invention include Mac OS by Apple Computer, LINUX, and the Windows family of operating systems by Microsoft Corporation.

Display interface 302 coordinates access to the graphics hardware, such as display 216, the frame buffer (not shown), and the like. Display interface 302 provides an interface for applications, such as application 304, to output data to display 216 and handle device interrupts. For example, display interface 302 may provide a function for displaying a window of information for application 304 at a specified location on display 216. Display interface 302 may be implemented based on well known software and hardware, such as the graphical device interface (GDI) layer of Microsoft Windows, or a LINUX-based display interface.

Application 304 refers generally to any application that may be run on host computer 102. For example, application 304 may be word processing application, a spreadsheet, an Internet browser, and the like. Such applications are well known to those skilled in the art.

Host borrowing manager 306 enables the borrowing of windows by remote computer 104 from host computer 102. In particular, when appropriate, host borrowing manager 306 intercepts display data sent from application 304. Instead of being routed to display interface 302, host borrowing manager 306 routes this information to remote computer 104.

Host borrowing manager 306 may run on host computer 102 continuously or on as-needed basis. For example, host borrowing manager 306 may run as a background process. Alternatively, host borrowing manager 306 may be triggered upon request, for example, in response to a request from remote computer 104. The mode in which host borrowing manager 306 operates may be determined by system configuration or based on a user setting.

To intercept the display data, host borrowing manager 306 may install a probe into display interface 302 in place of the standard interface used by OS 300. The probe intercepts and reroutes the display data from application 304 back to host borrowing manager 306. Host borrowing manager 306 may then accumulate and package the display data for transmission to remote computer 104. Host borrowing manager 306 may invoke the network communications functions of OS 300 in order to forward the display data.

Remote computer 104 may comprise an OS 308, a display interface 310, a display 312, and a remote borrowing manager 314. Like OS 300, OS 308 is an integrated collection of routines that service the sequencing and processing of programs and applications by remote computer 104. Of note, OS 308 may be a different operating system from OS 300.

Display interface 310 coordinates access to the graphics hardware for remote computer 104, as display 312, and the like. Display interface 310 provides an interface for applications running on remote computer 104 to output data to display 312 and handles device interrupts. Display interface 310 may also be implemented based on well known software and hardware, such as GDI for Windows or a LINUX-based display interface.

Remote borrowing manager 314 operates in conjunction with host borrowing manager 306 to borrow windows from host computer 102. In particular, when appropriate, remote borrowing manager 314 receives the display data sent from host computer 102. Remote borrowing manager 314 may then perform various functions on this data, such as translation of formats, recalculation of display resolution, etc. For example, borrowing manager 314 may perform various calculations to compensate for any differences between displays 216 and 312. Borrowing manager 314 may scale a borrowed window to fit the destination display or may use other techniques to fit a borrowed window within a limited space, such as scroll bars.

Remote borrowing manager 314 may run on remote computer 104 continuously or on as-needed basis. The mode in which remote borrowing manager 314 operates may be determined by system configuration or based on a user setting.

In order to coordinate the borrowing of windows, both computers 102 and 104 may also include a borrowed windows list 316. Borrowed windows list 316 ensures that both computers 102 and 104 agree on the windows that either are borrowing. Borrowed windows list 316 may also provide a mechanism for tracking changes to occur in a borrowed window.

Borrowed windows list 316 may include one or more fields that indicates the status of a borrowed window, such as user input commands, screen data, display screen resolution, relative depth in comparison to other windows, etc. In some embodiments, borrowed windows list 316 may be formatted in such a manner that is independent of operating system formats, such as extensible markup language. This allows computers 102 and 104 to be implemented with different operating systems. For example borrowed windows list 316 may include fields to indicate: a unique identifier for each borrowed window; application which originally owns the window, such as application 304; the size of the window; and information indicating the bounds for the borrowed window, such as coordinates for corners of the window.

Computers 102 and 104 may periodically exchange copies of borrowed windows list 316 in order to stay current with each other. For example, when remote computer 104 has borrowed a window, any user input changes to that window may be recorded into borrowed windows list 316. Such changes may be learned from interfacing OS 308. Remote borrowing manager 316 may periodically check with OS 308 to detect changes in the borrowed window. If changes have occurred, remote borrowing manager 316 may update its copy of borrowed windows list 316 and transmit it to host computer 102. When host computer 102 receives the update, host borrowing manager 306 may then update its copy of borrowed windows list 316.

Of note, in some circumstances, both computers 102 and 104 may have updates to a borrowed window. In order to avoid conflicts in these updates, the computer which has borrowed the computer may control the order of updates to borrowed windows list 316. This feature is consistent with the concept of a computer "borrowing" a window, and thus, obtaining temporary control over that window. In some embodiments, the computer which has borrowed a window may be issued a token or flag that is recorded in borrowed windows list 316. For example, the token or flag may include an identifier for either computer 102 or 104 and may include a time-stamp.

In some embodiments, borrowed windows list 316 also enables computers 102 and 104 to operate asynchronously from each other. For example, after initially borrowing a window from host computer 102, remote computer 104 may no longer need to be connected to host computer 102. When remote computer 104 is ready to give back or return a borrowed window, then remote computer 104 may re initiate a network connection with host computer 102. Any changes that occurred in the borrowed window may then be passed in borrowed windows list 316.

Figure 4:
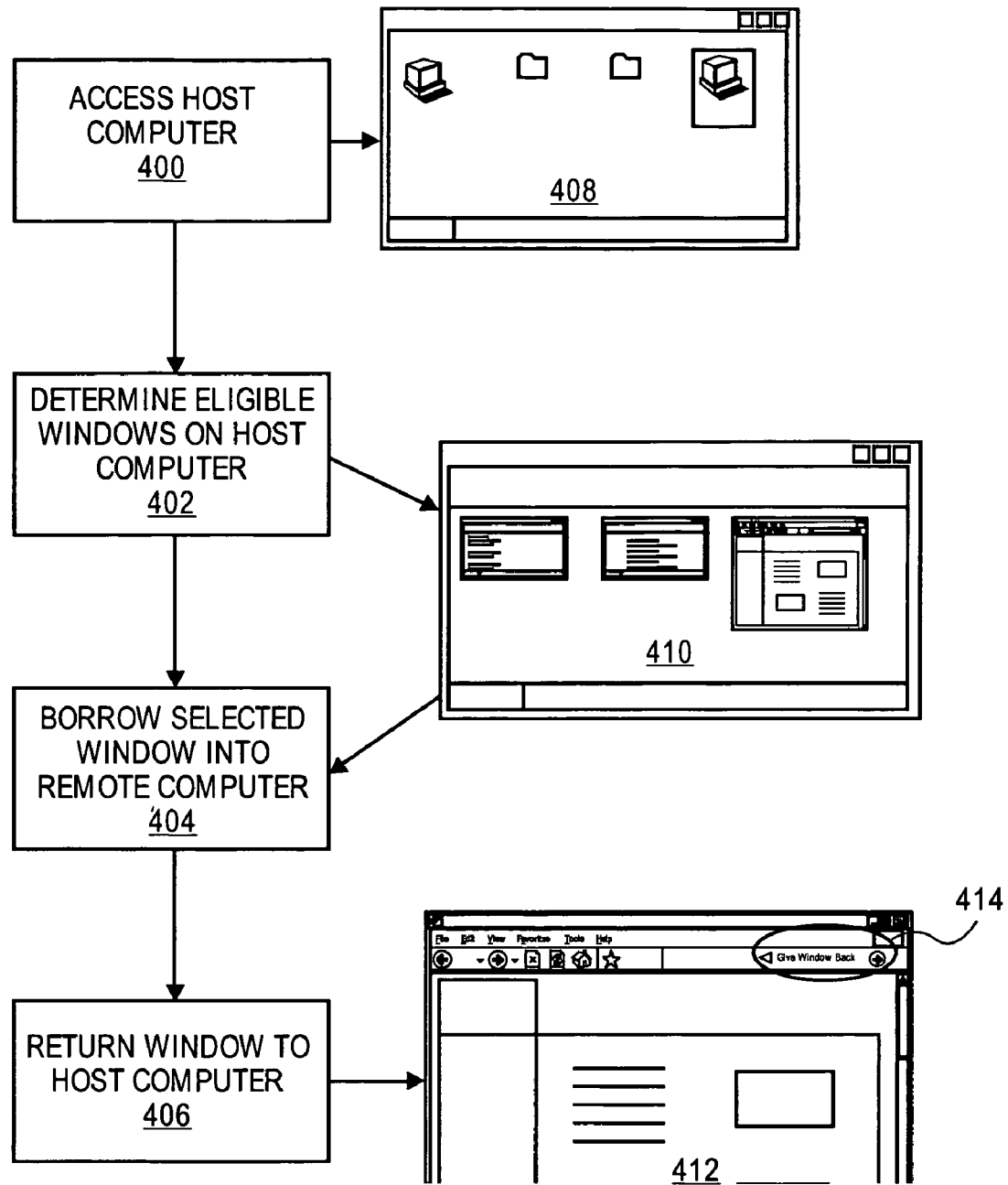
FIG. 4 illustrates an exemplary process flow for borrowing a window.

FIG. 4 illustrates an exemplary process flow for borrowing a window that is consistent with the principles of the present invention. For purposes of explanation, the process flow shown will be explained with reference to remote computer 104 borrowing a window from host computer 102. Of course one skilled in the art will recognize how the roles of computers 102 and 104 may be reversed. In addition, FIG. 4 also shows some exemplary screen displays that may assist in explaining the actions performed by computers 102 and 104.

In stage 400, processing may begin with remote computer 104 requesting access to host computer 102. For example, a user at remote computer 104 may start or invoke remote borrowing manager 314. In response, remote borrowing manager 314 may output on display 312 a list of possible computers from which a window can be borrowed. As shown in FIG. 4, screen shot 408 illustrates four computers that are accessible to remote computer 104 for borrowing a window.

Of course, one skilled in the art will recognize that the user at remote computer 104 may be authenticated. For example, the user at remote computer 104 may be required to provide a login name and password to host computer 102 or a third party, such as a website on the Internet. Alternatively, the user at remote computer 104 may be a pre-authorized user of host computer 102. For example, the user may have an account or profile loaded into host computer 102. In addition, host computer 102 may then provide this list of pre-authorized users to host borrowing manager 306. Accordingly, if the user is on this list, host borrowing manager 306 may automatically permit access to the user. Other security mechanisms may also be implemented, such as digital certificates, encryption, and rotating ports. Assuming the user is authenticated, he may then select a computer from which to borrow window, such as host computer 102.

This selection by the user may then trigger remote borrowing manager 314 to open a connection to host computer 102, for example, through network 106. Host computer 102 may then undergo a set of well known communications protocols for establishing a connection with remote computer 104. For example, host computer 102 and remote computer 104 may negotiate which protocol, such as TCP or UDP, to use, connection speed, and which ports to open for the connection. Computers 102 and 104 may also negotiate various security features, such as encryption parameters. Processing may then flow to stage 402.

In stage 402, the windows that are eligible for borrowing are indicated. For example, host computer 102 may send one or more packets of data that lists eligible windows or applications. Host computer 102 may determine which windows or applications may allow borrowing, for example, based on a setting in OS 300 or the level of authentication provided by the user. In some embodiments, host computer 102 indicates the windows that are currently displayed on display 216 as being eligible for borrowing. In addition, host computer 102 may provide one or more images or snapshots of the windows being displayed on display 216 to assist in identifying the contents of these windows. Host computer 102 may provide a standard or generic icon for a window based on its underlying application, or it may provide a snapshot (or thumbnail) image of the window. Such snapshots are well known to those skilled in the art. One skilled in the art will also recognize that there are a variety of well known mechanisms for controlling and indicating which windows can be borrowed.

In response, remote computer 104 may provide a window or screen that notifies the user of the eligible windows on its display 312. Such a screen shot is shown in FIG. 4 as screen shot 410. As shown, screen shot 410 indicates that three windows are eligible for borrowing by remote computer 104. The user may then indicate his selection, for example, using a mouse or keyboard input. Processing may then flow to stage 404.

In stage 404, the selected window is borrowed from host computer 102 and placed under the control of remote computer 104. In particular, host borrowing manager 306 may install a probe into display interface 302. The probe may be configured to intercept and reroute data that corresponds to the selected window. For example, the probe may be provided the address space or an identifier for application 306. Host borrowing manager 306 may then package the intercepted data and transmit them to remote computer 104. Host borrowing manager 306 may also open or create an entry in borrowed windows list 316. Host computer 102 may also transmit this information to remote computer 104. At this point in processing, host computer 102 has essentially relinquished its control over the window.

Meanwhile, at remote computer 104, OS 308 passes the data transmitted from host computer 102 to remote borrowing manager 314. Remote borrowing manager 314 parses the data and initiates borrowing of the window. In particular, remote borrowing manager 314 may forward (or translate, if necessary) the display data for the borrowed window to display interface 310. In response, the borrowed window may then appear on display 312. In addition, borrowing manager 314 may update its copy of borrowed windows list 316 to acknowledge its borrowing of the window. The user may be requested to confirm the borrowing of the window by selecting an appropriate button on the windows desktop of remote computer 104. At this point in processing, remote computer 104 has effectively borrowed the window from host computer 102 and, in some embodiments, has taken exclusive control over the borrowed window. While borrowing the window, the user may then perform various operations and make changes to the borrowed window, such as resizing the window or editing data in the window. Remote borrowing manager 314 may record these changes and send them back to host borrowing manager 306. Remote borrowing manager 314 may send the changes continuously as they occur, in batches (such as at a predetermined time interval), or in response to various events (such as a user selection or when the borrowed window is given back).

In addition, remote computer 104 may elect to disconnect from host computer 102. The user at remote computer 104 may manually disconnect, for example, by selecting a "disconnect" button provided on the windows desktop of remote computer 104. Alternatively, remote computer 104 may automatically disconnect from host computer 102 upon borrowing the window. Of course, one skilled in the art will recognize that computers 102 and 104 may maintain persistent connection through network 106.

When the user wishes to give back a borrowed window, processing may then flow to stage 406. The user may indicate the desire to give back a window in various ways. For example, in some embodiments, the borrowed window may include a "Give Window Back" button that the user can select by keyboard or mouse input. As shown in FIG. 4, screen shot 412 illustrates a "give back" button 414. Of course, one skilled in the are will recognize that other graphical user interface techniques may be used to allow the user to give back a window.

In response to the user selecting button 414, remote borrowing manager 314 may commence various operations to return the borrowed window. For example, remote borrowing manager 314 may stop sending display data to display interface 310. In addition, remote borrowing manager 314 may make a set of final updates to borrowed windows list 316. Remote borrowing manager 314 may then package one or more packets of data and have them transmitted to host computer 102. For example, OS 308 may open (if necessary) a connection to host computer 102 through network 106. One skilled in the art will also recognize that a borrowed window may be returned to host computer 102 based on other types of events. For example, if remote computer 104 is shut down or loses its connection to network 106, then remote borrowing manager 314 may be configured to automatically give back the borrowed window. As another example, the user may return to host computer 102 explicitly "take back" a window from remote computer 104. Such an action may be indicated by a keyboard or mouse input from the user at host computer 102. One skilled in the art will recognize other scenarios in which a borrowed window may be returned, such as after a predetermined idle time.

OS 300 may eventually receive the packets of data and forward them to host borrowing manager 306. Host borrowing manager 306 may then close the probe it previously installed in display interface 302. This may result in the borrowed window returning to display 216. In addition, host borrowing manager 306 may update borrowed windows list 316 to close the borrowing of the window. Host borrowing manager 306 may then shut itself down or continue to run in the background.

Figure 5:
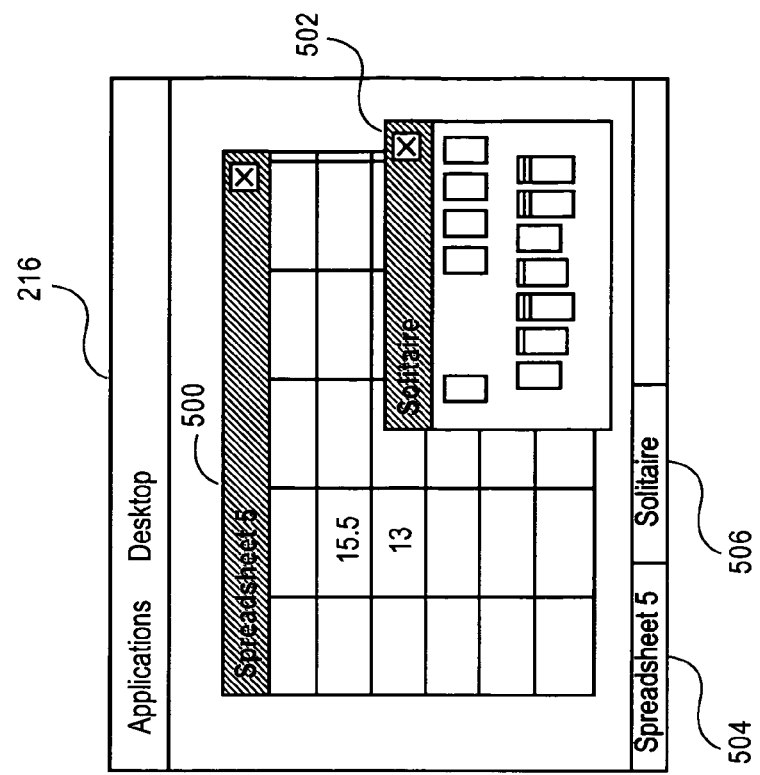
FIGS. 5-10 illustrate various displays related to the process for borrowing and giving back a window.
Figure 5:
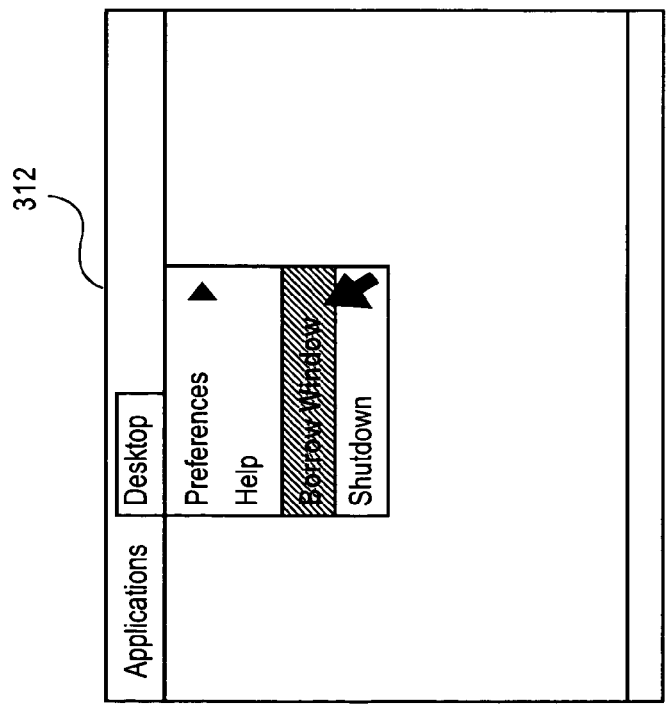

FIGS. 5-10 will now be described in order to illustrate another example of borrowing and giving back windows in accordance with embodiments. In general, FIGS. 5-10 illustrate a progression of the information displayed on display 312 of remote computer 104 and display 216 of host computer 102. In the example shown, it is assumed that a user is already logged in to host computer 102 and was working on a spreadsheet "Spreadsheet 5." However, for various reasons, the user is now operating from remote computer 104 and wishes to borrow the window for the spreadsheet. The progression of the user borrowing this window will now be described FIG. 5 illustrates the user initiating the borrowing of a window. Currently, the user is operating from remote computer 104 and viewing display 312. As shown, the user may select a pull down window and select "Borrow Window" while operating from remote computer 312.

Meanwhile, at host computer 102, display 216 may show a window 500 for a spreadsheet program and the file "Spreadsheet 5," and a window 502 for another application, such as a solitaire game. Of course, other windows may appear on display 216. In addition, host computer 102 may indicate the running of the spreadsheet application and the solitaire game by displaying icons 504 and 506 on a task bar in display 216.

Figure 6:
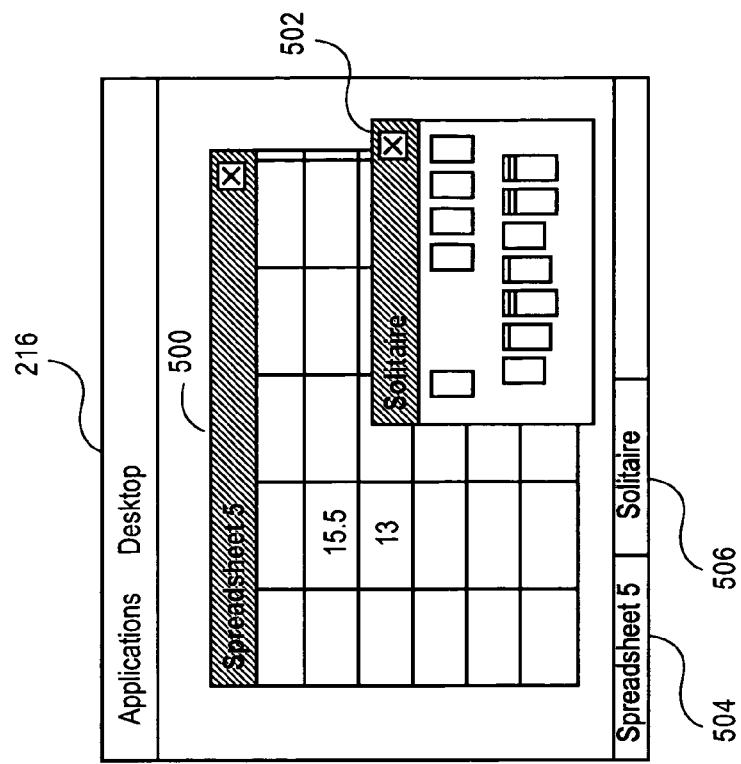
Figure 6:
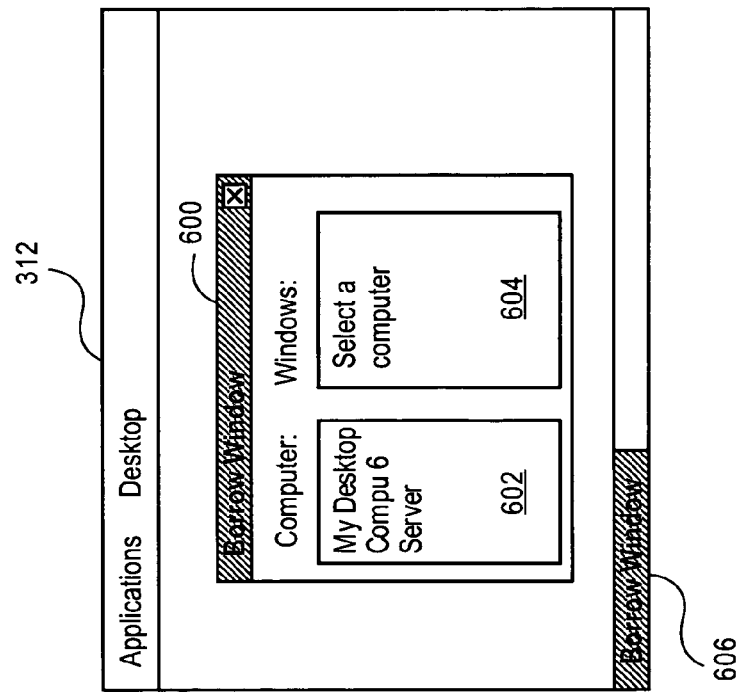

Proceeding now to FIG. 6, at remote computer 106, display 312 may now display a dialog window 600 in response to the users actions. Window 600 may further include a list frame 602 and selection frame 604. List frame 602 may show the various computers in which the user is logged in or authorized to log in. This data may be based on information collected by remote borrowing manager 314 or based on input from the user. For example, as shown in FIG. 6, the user is logged in or authorized for computers called "My Desktop,", "Compu6," and "Server." Since the user has not yet selected a computer, selection frame 604 may currently display an informational warning of "Select a Computer." In addition, display 216 may also display a task bar icon 606 to indicate the running of a windows borrowing application. Meanwhile, at host computer 102, display 216 essentially remains unchanged.

Figure 7:
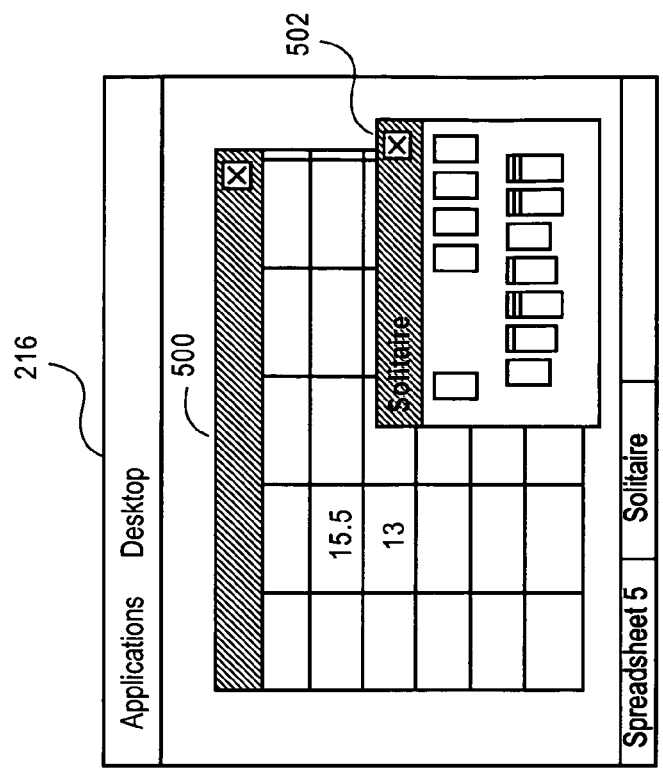
Figure 7:
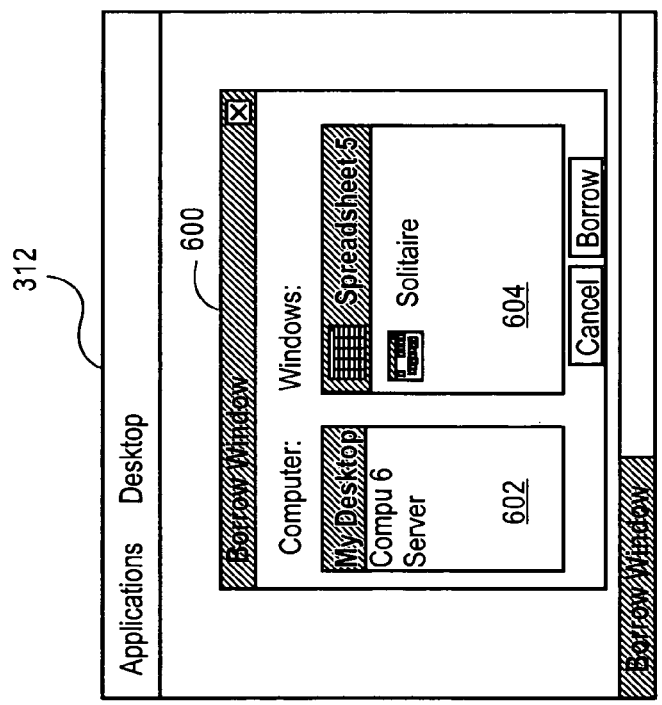

Proceeding now to FIG. 7, the user has selected the computer "My Desktop." In this example, it is assumed that "My Desktop" was the name assigned to host computer 102 by the user. In response to selecting a computer, selection frame 604 may now be updated to indicate the windows currently on display at display 216. For example, selection frame 604 may now provide text and corresponding graphics to indicate windows 500 and 502 as "Spreadsheet 5," and "Solitaire," respectively. For example, as shown, frame 604 displays respective snapshots (or icons) and title for the "Spreadsheet 5" and "Solitaire" windows (i.e., windows 500 and 502) from display 216. As noted, in some embodiments, the snapshots provided in frame 604 may indicate the current contents of their respective windows in display 216. Of course, one skilled in the art will recognize that generic icons or other visual indicator may also be used. In addition, window 600 may now provide action buttons for "Cancel" and "Borrow" to allow the user to confirm a selection.

Figure 8:
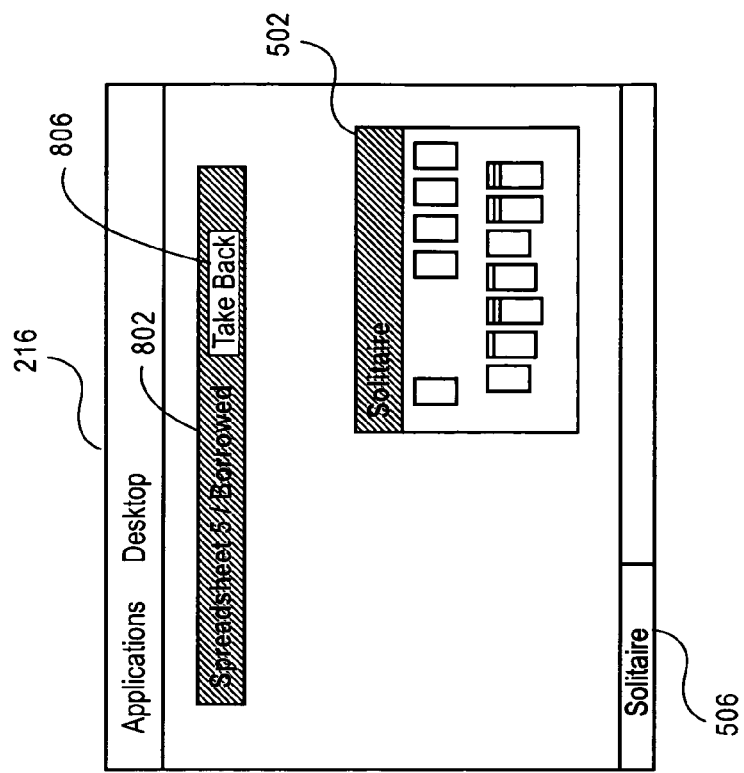
Figure 8:
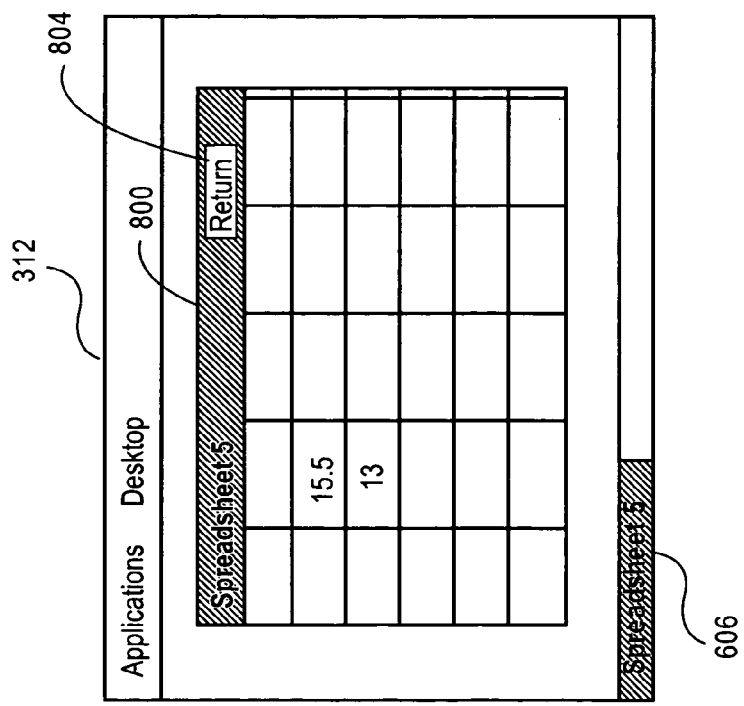

Proceeding now to FIG. 8, it is assumed that the user selected "Borrow" for window 500 (i.e., the window for "Spreadsheet 5"). In response, as explained above, remote computer 104 and host computer 102 operate in conjunction to redirect the display data for window 500. In some embodiments, host computer 102 continues to run the spreadsheet application. However, the operations of host borrowing manager 306 and remote borrowing manager 314 cause the display data for window 500 to be intercepted and sent to remote computer 104.

Accordingly, display 312 may now display a window 800, which corresponds to window 500. In some embodiments, window 800 may also include a "return" button 804. Return button 804 may be selected by the user to return or give back the window. In addition, task bar icon 606 may now be updated to read "Spreadsheet 5" to indicate that window 800 is a borrowed version of window 500 from host computer 102. Furthermore, window 800 may be modified from a standard window in that it does not include the typical "X" icon normally used for closing such a window. Such an omission may be used to further indicate that window 800 is a borrowed window. Of course, one skilled in the art will recognize that other visual indicators may be used by embodiments of the present invention.

Meanwhile at host computer 102, display 216 may be updated to indicate the borrowing of window 500. For example, in place of window 500, display 216 may now display a status bar 802 that indicates "Spreadsheet 5/Borrowed." Of course, other displays and information may be provided to indicate that a window has been borrowed. In addition, status bar 802 may include a "Take Back" button to allow the user to explicitly take back window 500 from remote computer 104. Status bar 802 may also be configured to lack the typical "X" icon that is generally used to close a window. Such an exclusion may be used to further emphasize that window 500 has been borrowed by remote computer 104. In order to reflect that window 500 was borrowed, display 216 may also remove the corresponding task bar icon 504. Of course, one skilled in the art will recognize that a wide variety of other visual cues and techniques may be used in embodiments of the present invention.

Figure 9:
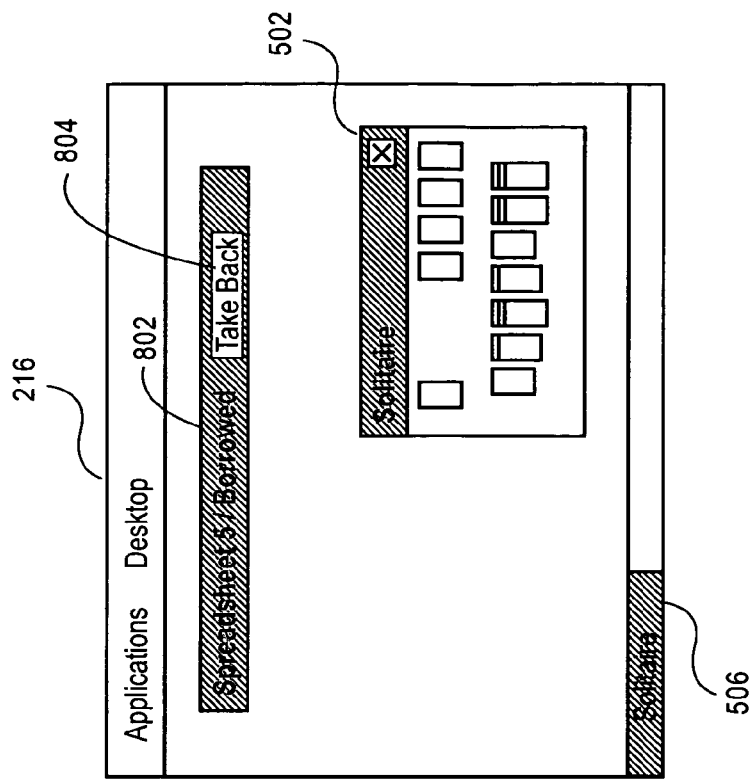
Figure 9:
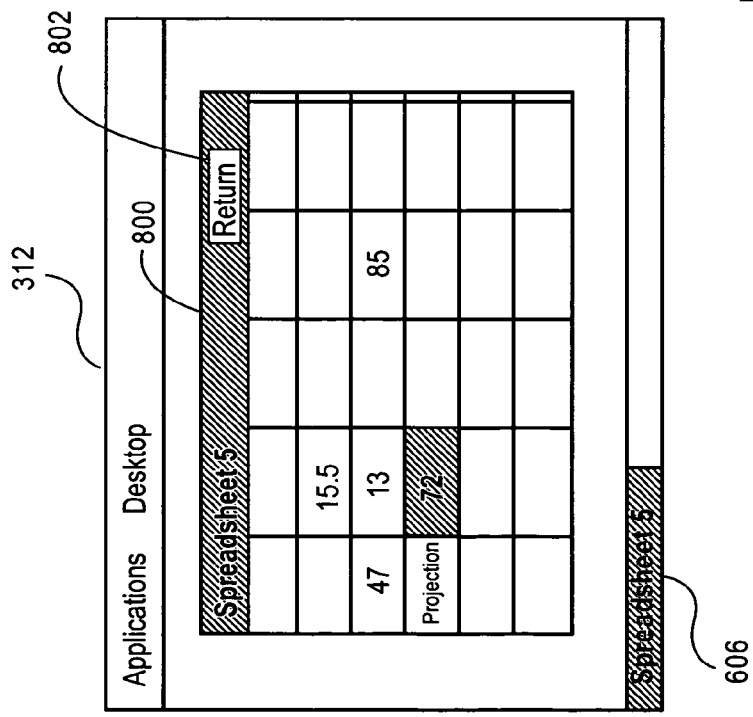

Proceeding now to FIG. 9, the user has borrowed the window and now may perform various operations as if the window was locally generated. For example, as shown, the user has edited various entries in "Spreadsheet 5." In some embodiments, these changes are transmitted back to host computer 102 by remote borrowing manager 314. Since it may still be running the spreadsheet application, host computer 102 may also record these changes and adjust the operation of the spreadsheet application accordingly. Upon completion of borrowing the window, the user may then select return button 802 in initiate the "give back" process. As noted, a window may be given back or taken back in various situations, such as the user returning to host computer 102 and selecting "Take Back" button 804.

Meanwhile, in this example, display 216 may essentially remain the same. Of course, one skilled in the art will recognize that display 216 may be updated to reflect that user has made changes to "Spreadsheet 5." For example, status bar 802 may be adjusted with one or more graphics, or colored in different manner.

Figure 10:
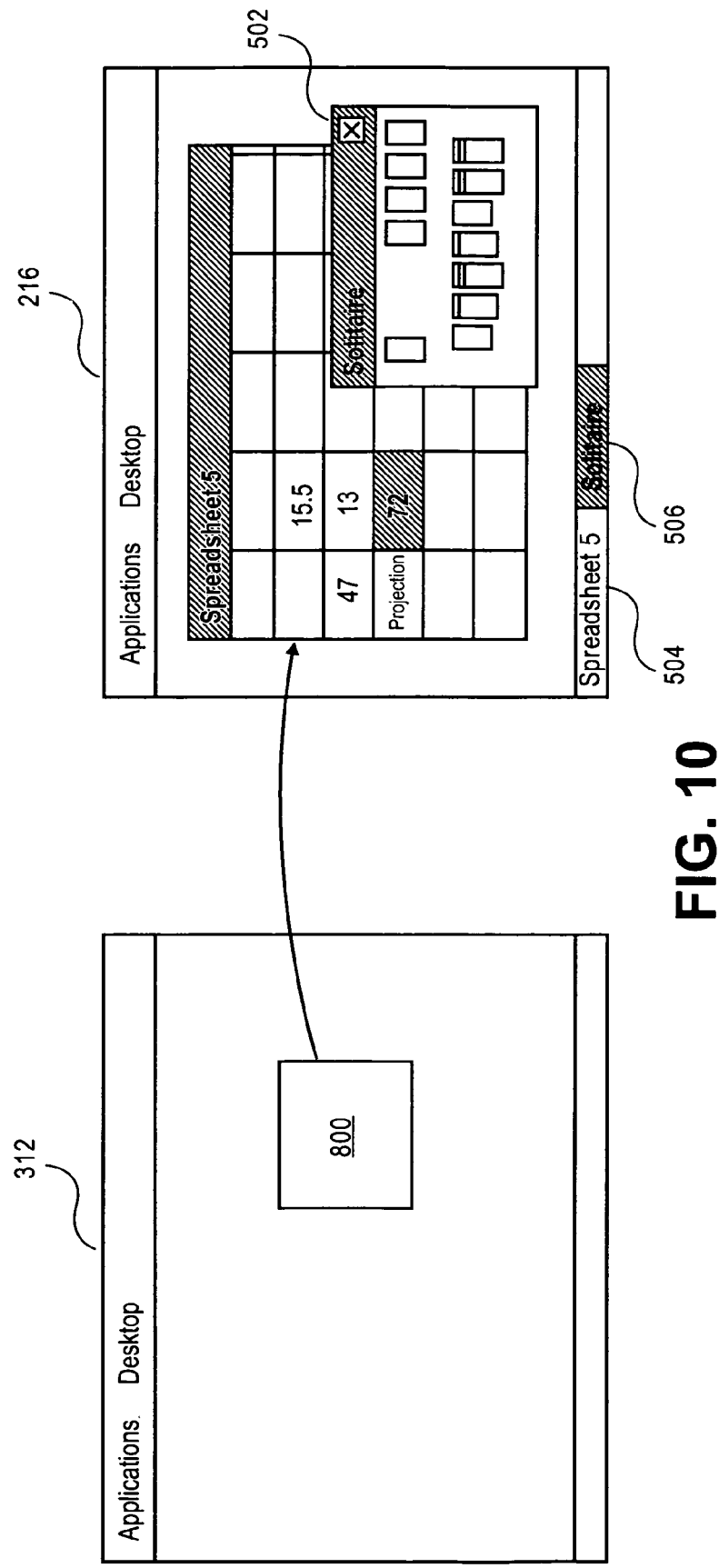

Proceeding now to FIG. 10, the user has completed the borrowing of a window. For example, display 312 may be updated to show window 800 minimizing or disappearing. In addition, task bar button 606 may also be removed from display 216 to reflect that the windows borrowing session has ended.

Meanwhile at host computer 102, display 216 has been updated. As shown, windows 500 is again displayed, but also reflects the changes made by the user at remote computer 104 during the borrowing session. Of course, one skilled in the art will recognize that the user may be prompted to confirm the changes, such as a dialog box, before committing the changes to the application at host computer 102. In addition, task bar icon 504 may reappear to also indicate that remote computer 104 is again displaying window 500. The user may then continue normal operations at host computer 102.

Embodiments of the present invention may be provided as one or more computer-readable programs embodied on or in one or more computer readable mediums or in the form of a file that can be downloaded. The computer readable medium may be a floppy disk, a hard disk, a CD ROM, a flash memory card, a PROM, a RAM, a ROM, or a magnetic tape. In general, the computer-readable programs may be implemented in any programming language. Some examples of languages that can be used include C, C++, or JAVA. The software programs may be stored on or in one or more articles of manufacture as object code.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of borrowing a window from a host computer, said method comprising:
   determining which windows at the host computer are eligible to be borrowed by a second computer over a network connection;
   selecting at least one of the determined eligible windows, wherein the selected window is a graphical user interface for an application running on the host computer;
   removing the selected window from the host computer; and
   directing display data for the selected window on the host computer to the second computer.

2. The method of claim 1, wherein determining which windows at the host computer are eligible to be borrowed comprises:
   determining which windows are currently displayed on the host computer; and
   displaying a list of the windows that are currently displayed.

3. The method of claim 1, further comprising:
   polling a local operating system for changes to the selected window.

4. The method of claim 1, further comprising inserting a button into a display of the host computer that triggers a return of the selected window to the host computer.

5. An apparatus comprising a memory containing instructions and a processor coupled to the memory and configured to execute the instructions to perform the method of claim 1.

6. A non-transitory computer readable medium containing program code having instructions that cause a processor to perform the method of claim 1.

7. The method of claim 1, further comprising:
   displaying the directed display data in a window on the second computer.

8. A method of allowing a window at a host computer to be borrowed by a remote computer over a network connection, said method comprising:

receiving via the network connection a request to borrow a window from the remote computer;

providing information that indicates which windows at the host computer are eligible for borrowing;

receiving information that indicates which window has been selected for borrowing;

removing the selected window from the host computer, wherein the selected window is a graphical user interface for an application running on the host computer;

intercepting display data being generated by the host computer for the selected window; and sending the display data for the selected window to the remote computer.

9. The method of claim 8, wherein providing information that indicates which windows are eligible for borrowing comprises transmitting a window to the remote computer that includes thumbnails of the windows that are eligible for borrowing.

10. The method of claim 8, wherein intercepting display data for the selected window comprises:

identifying display data that corresponds to the selected window; and routing only the display data that corresponds to the selected window.

11. An apparatus comprising a memory containing instructions and a processor coupled to the memory and configured to execute the instructions to perform the method of claim 8.

12. A non-transitory computer readable medium containing program code having instructions that causes a processor to perform the method of claim 8.

13. A system configured to allow a user operating from a first processor to borrow a window for an application running on a second processor, wherein the user is authorized on the second processor, said system comprising:

the first processor configured to determine which windows at the second processor are eligible to be borrowed, to select an eligible window, and to borrow the selected window by obtaining exclusive control of the selected window, wherein the selected window is a graphical user interface for an application running on the second processor; and the second processor, coupled to the first processor, and configured to receive a request to borrow a window, to provide information that indicates which windows are eligible for borrowing, to determine which eligible window has been selected for borrowing, to remove the selected window, to intercept display data being generated by the second processor for the selected window, to redirect the display data for the selected window to the first processor.

14. The system of claim 13, wherein the first processor is configured to recognize changes to the borrowed window and transmit the changes back to the second processor.

15. The system of claim 13, wherein the first processor is configured to confirm that the user is logged in to the second processor.

16. The system of claim 13, wherein the second processor is configured to display information that indicates the selected window has been selected for borrowing when the display data is being redirected.

17. The system of claim 13, wherein the second processor is configured to take back the window selected for borrowing in response to a user input.

18. The system of claim 13, wherein the second processor is configured to take back the window selected for borrowing when the connection between the first and second processors has failed.

* * * * *